US012782209B2

(12) United States Patent
Karasawa et al.

(10) Patent No.: US 12,782,209 B2
(45) Date of Patent: Nov. 3, 2026

(54) LOAD SENSOR ELEMENT

(71) Applicant: KOA CORPORATION, Ina (JP)

(72) Inventors: Atsushi Karasawa, Nagano (JP); Natsumi Aoki, Nagano (JP); Masaya Tsuno, Nagano (JP)

(73) Assignee: KOA CORPORATION, Ina (JP)

( * ) Notice: Subject to any disclaimer, the term of this patent is extended or adjusted under 35 U.S.C. 154(b) by 215 days.

(21) Appl. No.: 18/849,803

(22) PCT Filed: Feb. 10, 2023

(86) PCT No.: PCT/JP2023/004492
§ 371 (c)(1),
(2) Date: Sep. 23, 2024

(87) PCT Pub. No.: WO2023/181687
PCT Pub. Date: Sep. 28, 2023

(65) Prior Publication Data

US 2025/0198863 A1 Jun. 19, 2025

(30) Foreign Application Priority Data

Mar. 25, 2022 (JP) ................................ 2022-050836

(51) Int. Cl.
*G01L 1/22* (2006.01)

(52) U.S. Cl.
CPC .......... *G01L 1/2281* (2013.01); *G01L 1/2287* (2013.01)

(58) Field of Classification Search
CPC ........ G01L 1/2281; G01L 1/2287; G01L 1/26
See application file for complete search history.

(56) References Cited

U.S. PATENT DOCUMENTS 5,134,885 A * 8/1992 Hecht .................. G01L 1/2281 73/708
6,862,937 B2 * 3/2005 Fujita .................. G01L 1/2281 73/766
(Continued)

FOREIGN PATENT DOCUMENTS

CN 105181217 A 12/2015
JP 64-61628 A 3/1989
(Continued)

*Primary Examiner* — David J Bolduc
(74) *Attorney, Agent, or Firm* — Jordan IP Law, LLC

(57) ABSTRACT

A load sensor element includes a substrate and an inorganic layer having a pressure receiving surface configured to receive a load, the inorganic layer being provided so as to cover a part of a front surface that is a first surface of the substrate. The load sensor element includes a thin-film resistance body formed by a resistance body whose resistance value is changed in response to the load received by the inorganic layer. The thin-film resistance body has: a main body portion sandwiched between the substrate and the inorganic layer, and a first end portion and a second end portion that are both end portions mounted on an exposed portion of the substrate that is not covered by the inorganic layer. The load sensor element includes a first temperature-compensation resistance body independent from the thin-film resistance body, the first temperature-compensation resistance body being arranged on the exposed portion of the front surface that is the first surface of the substrate. The load sensor element includes a second temperature-compensation resistance body arranged on a back surface that is a second surface of the substrate, the second temperature-compensation resistance body being configured to exhibit the same behavior as the first temperature-compensation resistance body.

6 Claims, 10 Drawing Sheets

(56) References Cited

U.S. PATENT DOCUMENTS

| | | | | |
|---|---|---|---|---|
| 7,007,553 | B2 * | 3/2006 | Kinoshita | G01P 15/0922 73/777 |
| 2012/0247220 | A1 * | 10/2012 | Inamori | G01L 1/2281 73/766 |
| 2014/0137651 | A1 * | 5/2014 | Stambaugh | G01L 9/065 73/708 |
| 2018/0180502 | A1 * | 6/2018 | Kim | G01L 9/0054 |
| 2022/0276105 | A1 * | 9/2022 | Kaneko | G01L 1/205 |

FOREIGN PATENT DOCUMENTS

| | | | |
|---|---|---|---|
| JP | H07-167720 | A | 7/1995 |
| JP | 2004-205410 | A | 7/2004 |
| JP | 2007-333408 | A | 12/2007 |

* cited by examiner

LOAD SENSOR ELEMENT

TECHNICAL FIELD

The present invention relates to a load sensor element.

BACKGROUND ART

JPH07-167720A discloses a pressure sensor.

This pressure sensor includes a resin upper case, and the pressure sensor is configured by being incorporated in the upper case. In a pressure sensor element, a peripheral edge portion of a circular portion of its substrate is formed as a fixed portion, and the circular portion inside the fixed portion is utilized as a pressure receiving portion. A strain-sensitive resistance body is provided on the pressure receiving portion of the pressure sensor element. In addition, the pressure sensor includes an adjustment resistance body on a non-strain portion of the pressure sensor element.

SUMMARY OF INVENTION

In such a pressure sensor, a pipe is attached in communication with a concave portion in a lower case or a pipe is attached in communication with a concave portion formed in the upper case so as to corresponds to the element portion, and a pressure to be measured is applied to the circular portion of the element through one of these pipes. In other words, when a load is applied, the pressure sensor element is deformed as a whole. Therefore, even if the adjustment resistance body is used to attempt temperature compensation, the output from the adjustment resistance body is affected by the deformation of the pressure sensor element.

As a result, an accuracy of temperature correction was deteriorated.

Thus, an object of the present invention is to enable improvement of a temperature compensation accuracy.

A load sensor element of an aspect of the present invention is the load sensor element for measuring a surface pressure load, and the load sensor element includes: a substrate; and an inorganic layer having a pressure receiving surface configured to receive a load, the inorganic layer being provided so as to cover a part of a first surface of the substrate. The load sensor element includes a thin-film resistance body formed of a resistance body whose resistance value is changed in response to the load received by the inorganic layer, the thin-film resistance body having: a main body portion sandwiched between the substrate and the inorganic layer; and both end portions arranged on an exposed portion of the substrate, the exposed portion being not covered by the inorganic layer. The load sensor element includes: a first temperature-compensation resistance body independent from the thin-film resistance body, the first temperature-compensation resistance body being arranged on the exposed portion of the first surface of the substrate; and a second temperature-compensation resistance body arranged on a second surface of the substrate, the second temperature-compensation resistance body being configured to exhibit a same behavior as the first temperature-compensation resistance body.

According to this aspect, in the first temperature-compensation resistance body that is provided on the first surface of the substrate and the second temperature-compensation resistance body that is provided on the second surface of the substrate, when the substrate is deformed by the load received by the inorganic layer, the changes in the resistance values are caused in opposite polarities to each other.

Specifically, for example, if the resistance value of the first temperature-compensation resistance body is increased, the resistance value of the second temperature-compensation resistance body is decreased.

Therefore, by using the resistance value indicated by the first temperature-compensation resistance body and the resistance value indicated by the second temperature-compensation resistance body, it is possible to cancel out the change in the resistance value caused by the deformation of the substrate. As a result, it becomes possible to acquire a change component of the resistance value depending on the environmental temperature.

Therefore, in the load sensor element for measuring the surface pressure load, it is possible to improve the temperature compensation accuracy by suppressing the influence caused on the change in the resistance value due to the deformation of the substrate.

DESCRIPTION OF EMBODIMENTS

In the following, embodiments for carrying out the present invention will be described with reference to the attached drawings.

First Embodiment

A load sensor element 10 according to a first embodiment will be described first with reference to FIGS. 1 to 4.

Figure 1:
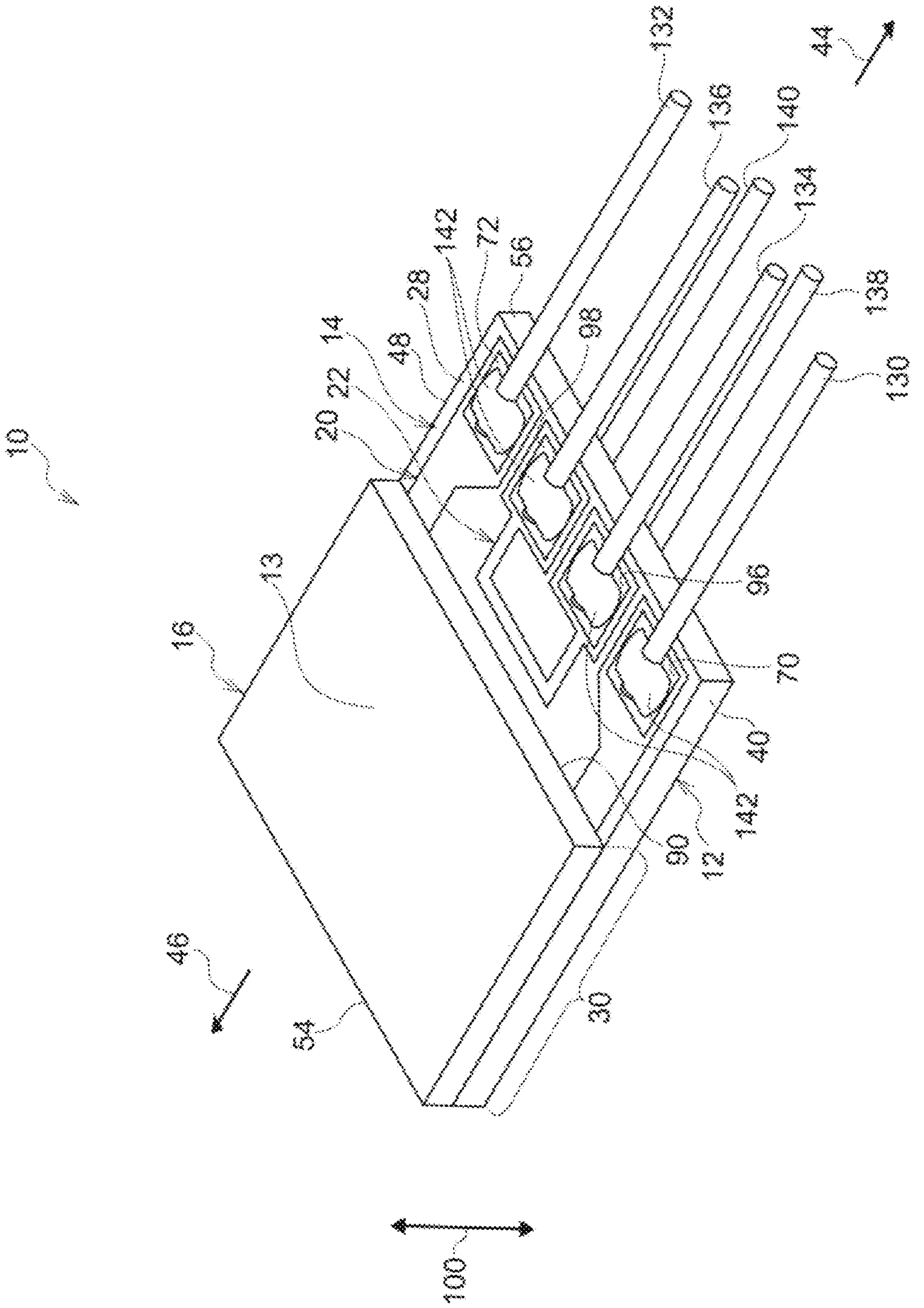
FIG. 1 is a perspective view of a load sensor element according to a first embodiment viewed from the front surface side.
Figure 2:
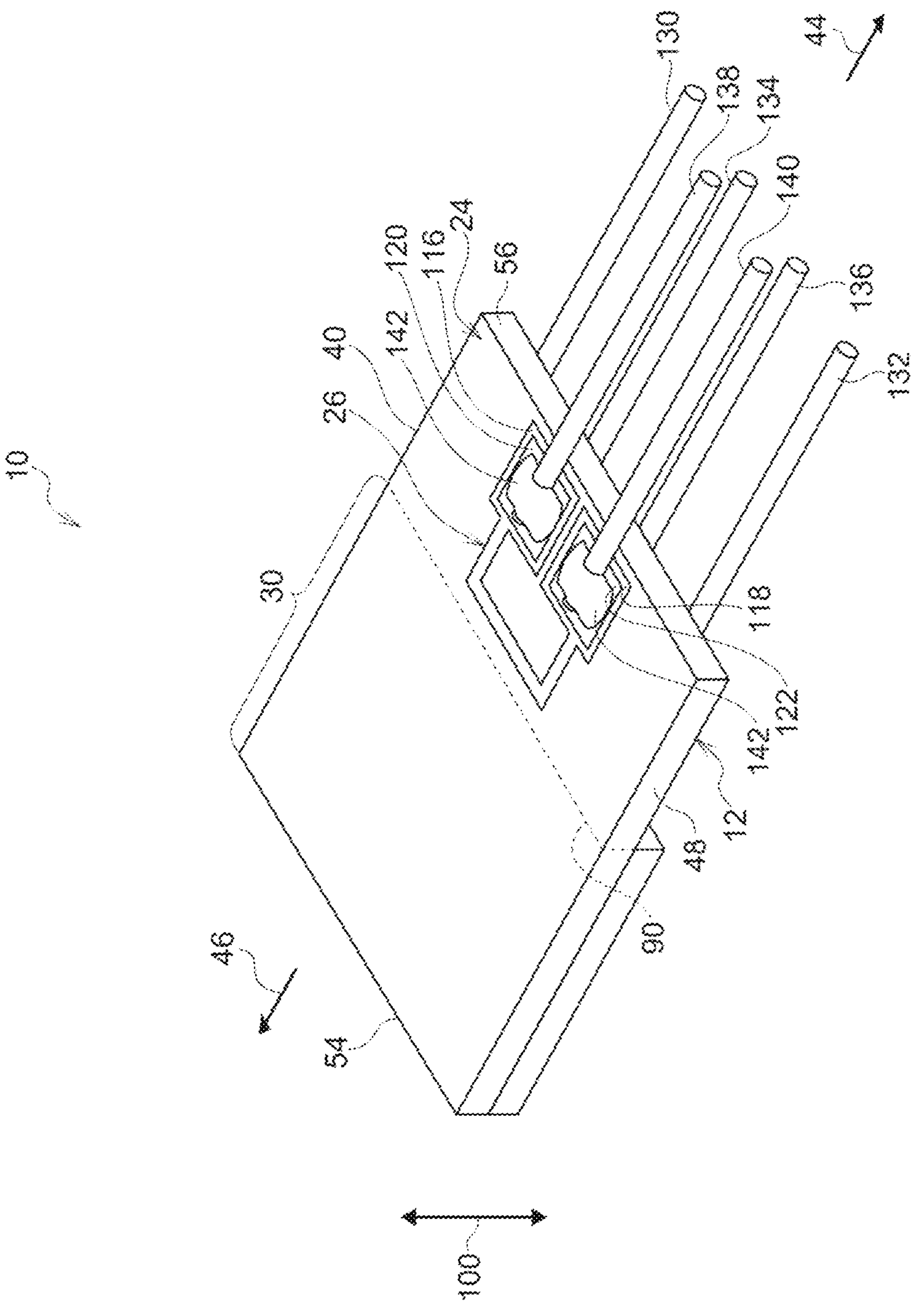
FIG. 2 is a perspective view of the load sensor element according to the first embodiment viewed from the back surface side.
Figure 3:
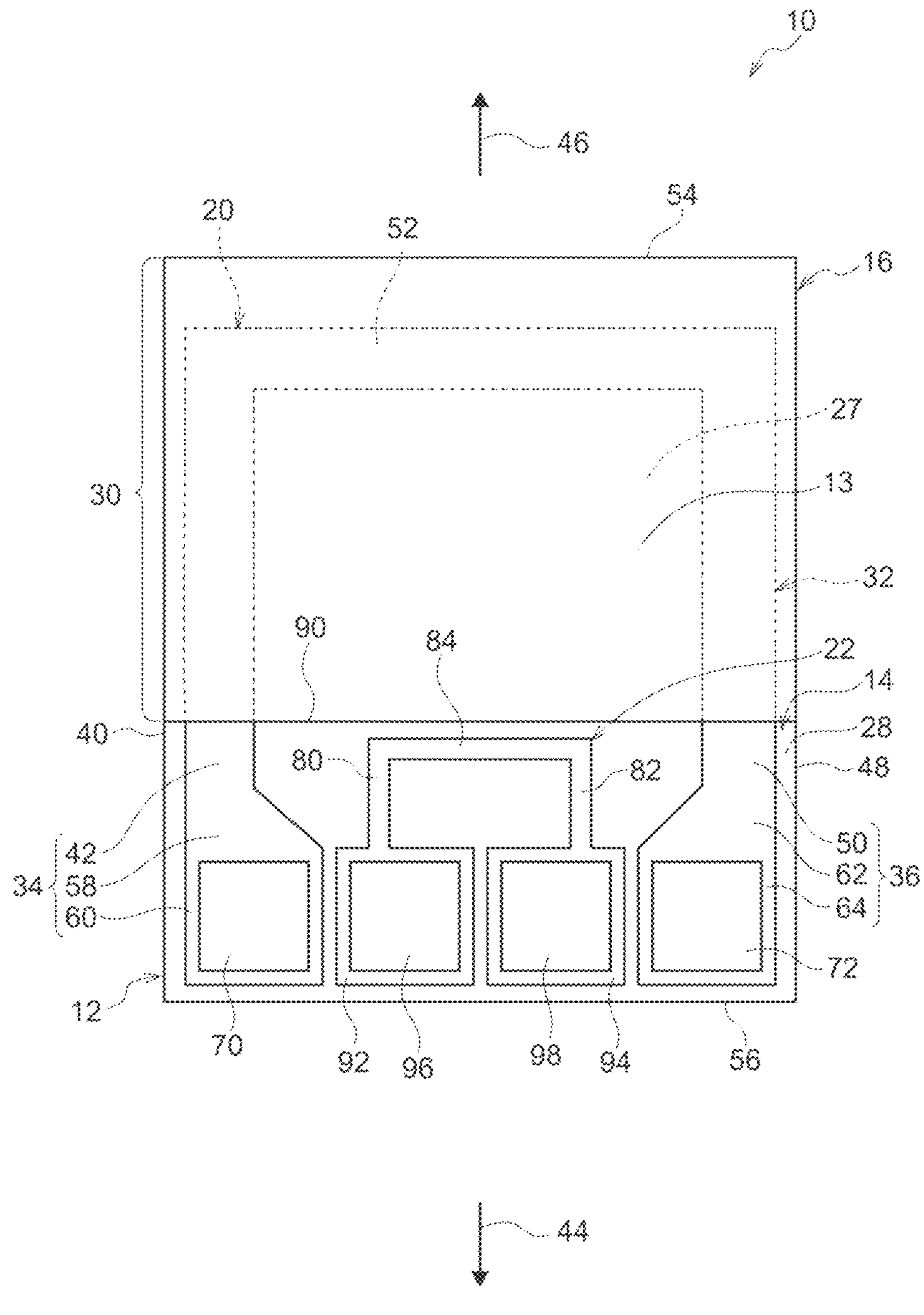
FIG. 3 is a diagram showing the load sensor element according to the first embodiment, and is a plan view showing a state in which the load sensor element, from which respective leads are removed, is viewed from the front surface side.
Figure 4:
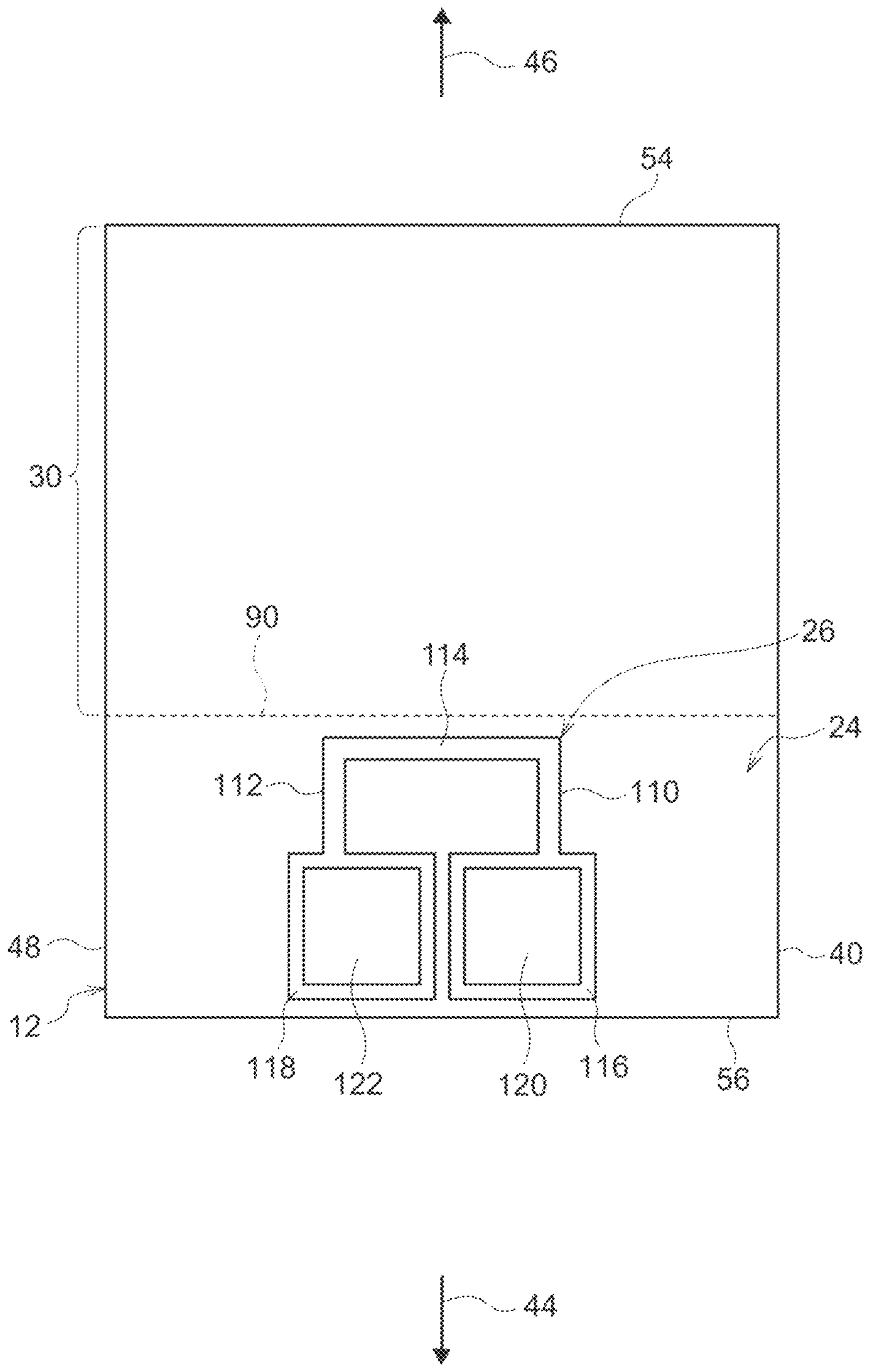
FIG. 4 is a diagram showing the load sensor element according to the first embodiment, and is a plan view showing a state in which the load sensor element, from which respective leads are removed, is viewed from the back surface side.

FIG. 1 is a perspective view of the load sensor element 10 according to the first embodiment viewed from a front surface 14 side of a substrate 12. FIG. 2 is a perspective view of the load sensor element 10 according to the first embodiment viewed from a back surface 24 side. FIG. 3 is a diagram showing the load sensor element 10 according to the first embodiment, and is a plan view showing a state in which the load sensor element 10, from which respective leads are removed, is viewed from the front surface 14 side. FIG. 4 is a diagram showing the load sensor element 10 according to the first embodiment, and is a plan view showing a state in which the load sensor element 10, from which respective leads are removed, is viewed from the back surface 24 side.

The load sensor element 10 according to this embodiment is a sensor element for measuring a surface pressure load. As an example, the load sensor element 10 is provided in a machine tool, and is used to detect the load on the machine tool in the machining axis direction for performing preload management.

As shown in FIG. 1, the load sensor element 10 includes: the substrate 12 that is made of a ceramic material or a metal material having an insulating layer on its surface; and an inorganic layer 16 that is provided so as to cover a part of the front surface 14, which is a first surface of the substrate 12, and has a pressure receiving surface 13 that receives a load.

As shown in FIGS. 1 and 2, the load sensor element 10 includes a thin-film resistance body 20 and a first temperature-compensation resistance body 22 that are provided on the front surface 14 of the substrate 12. The load sensor element 10 includes a second temperature-compensation resistance body 26 that is provided on the back surface 24, which is a second surface of the substrate 12.

Inorganic Layer

As shown in FIG. 1, a front surface of the inorganic layer 16 configures the pressure receiving surface 13. An entire front surface of the pressure receiving surface 13 is pressed substantially uniformly by the load. The inorganic layer 16 forms a rectangular shape (including a square shape) in a plan view. The inorganic layer 16 is made of an inorganic material. The inorganic layer 16 is made of the ceramic material having an insulating property, for example. As the inorganic material forming the inorganic layer 16, similarly to the substrate 12, it is preferable to use the inorganic material containing zirconia ($ZrO_2$) or alumina ($Al_2O_3$) as the main component.

The area of the inorganic layer 16 is smaller than the area of the substrate 12. The inorganic layer 16 covers the part of the front surface 14 of the substrate 12. The inorganic layer 16 covers a part of the thin-film resistance body 20 that is provided on the substrate 12 and does not cover both end portions (a first end portion 34 and a second end portion 36) of the thin-film resistance body 20.

The inorganic layer 16 is fixed to the substrate 12 by a bonding layer (not shown) made of a resin material. As an example, the resin material forming the bonding layer contains an epoxy resin as the main component.

Substrate

The substrate 12 is formed to have a rectangular shape in a plan view, and the substrate 12 is formed as a plate having an elongated rectangle shape. The substrate 12 is made of the ceramic material having an insulating property, for example. From the viewpoint of improving a compressive strength of the substrate 12, it is preferable to use the ceramic material containing zirconia ($ZrO_2$) or alumina ($Al_2O_3$) as the main component. The front surface 14 of the substrate 12 may also be made of the metal material having the insulating layer.

As shown in FIG. 3, the front surface 14 of the substrate 12 has a covered portion 27 that is covered by the inorganic layer 16 and an exposed portion 28 that is not covered by the inorganic layer 16. The covered portion 27 forms a pressure receiving region 30 to which the load is applied from the inorganic layer 16.

Thin-Layer Resistance Body

The thin-film resistance body 20 is a resistance body whose resistance value is changed in response to the load received by the inorganic layer 16. The thin-film resistance body 20 has: a main body portion 32 that is sandwiched between the substrate 12 and the inorganic layer 16; and the first end portion 34 and the second end portion 36 that are linked to the main body portion 32 and arranged on the exposed portion 28 of the substrate 12 that is not covered by the inorganic layer 16.

The thin-film resistance body 20 is made of, for example, nichrome (NiCr) material or chromium (Cr) material. As a result, a temperature coefficient of resistance (TCR) is lowered, and so, the load sensor element 10 can accurately detect the load even in a high temperature environment of 50° C. or higher.

In addition, the thin-film resistance body 20 is a resistive film that is formed in a thin film on the front surface 14 of the substrate 12 by a vacuum process such as a vapor deposition, a sputtering, and so forth. The formation method using sputtering tends to produce films with uniform characteristics and thickness. Therefore, the load sensor element 10, which includes the thin-film resistance body 20 formed as a uniform resistive film by a vacuum process such as a vapor deposition, a sputtering, and so forth, can accurately detect the load.

The thin-film resistance body 20 has a first thin-film extended portion 42 that extends linearly along a first side edge 40 of the substrate 12. The first thin-film extended portion 42 extends from a first direction side 44 towards a second direction side 46 of the substrate 12. The thin-film resistance body 20 has a second thin-film extended portion 50 that extends linearly along a second side edge 48 of the substrate 12. The second thin-film extended portion 50 extends from the first direction side 44 towards the second direction side 46 of the substrate 12.

The thin-film resistance body 20 has a thin-film joining portion 52 that joins the first thin-film extended portion 42 and the second thin-film extended portion 50. The thin-film joining portion 52 is arranged on the second direction side 46 of the substrate 12 and extends linearly along a second end edge 54 of the substrate 12.

The first thin-film extended portion 42, the second thin-film extended portion 50, and the thin-film joining portion 52 are set to have substantially the same width dimension.

A first widening portion 58 whose width dimension is increased towards a first end edge 56 of the substrate 12 is joined to the first direction side 44 of the first thin-film extended portion 42. A first rectangular portion 60 having a rectangular shape is joined to the first widening portion 58.

A second widening portion 62 whose width dimension is increased towards the first end edge 56 of the substrate 12 is joined to the first direction side 44 of the second thin-film extended portion 50. A second rectangular portion 64 having a rectangular shape is joined to the second widening portion 62. With such a configuration, the thin-film resistance body 20 is formed to have a U-shape.

In the thin-film resistance body 20, the thin-film joining portion 52, a part of the first thin-film extended portion 42, and a part of the second thin-film extended portion 50 form the main body portion 32 that is covered by the inorganic layer 16.

In this embodiment, although a description has been given of a case in which the main body portion 32 is formed to have the U-shape, this embodiment is not limited to this shape. For example, the main body portion 32 may be formed to have a meandering shape with repeated bends.

In the thin-film resistance body 20, a part of the first thin-film extended portion 42, the first widening portion 58, and the first rectangular portion 60 form the first end portion 34 that is not covered by the inorganic layer 16. In addition, in the thin-film resistance body 20, a part of the second thin-film extended portion 50, the second widening portion 62, and the second rectangular portion 64 form the second end portion 36 that is not covered by the inorganic layer 16.

A first electrode 70 having a rectangular shape is provided on the first rectangular portion 60 of the thin-film resistance body 20. The first electrode 70 is electrically connected the first rectangular portion 60 and is arranged on the first direction side 44 of the substrate 12.

In addition, a second electrode 72 having a rectangular shape is provided on the second rectangular portion 64 of the thin-film resistance body 20. The second electrode 72 is electrically connected to the second rectangular portion 64 and is arranged on the first direction side 44 of the substrate 12. The first electrode 70 and the second electrode 72 are formed on the first rectangular portion 60 of the thin-film resistance body 20 and the second rectangular portion 64 of the thin-film resistance body 20, respectively, by a method such as sputtering, vapor deposition, or the like. The first electrode 70 and the second electrode 72 are formed to have smaller dimensions than the first rectangular portion 60 of the thin-film resistance body 20 and the second rectangular portion 64 of the thin-film resistance body 20, respectively.

First Temperature-Compensation Resistance Body

The first temperature-compensation resistance body 22 is arranged on the exposed portion 28 of the front surface 14 that is the first surface of the substrate 12, in a state independent from and not electrically or physically connected to the thin-film resistance body 20. The first temperature-compensation resistance body 22 is arranged between the first end portion 34 and the second end portion 36 of the thin-film resistance body 20. The first temperature-compensation resistance body 22 is arranged inside the U-shape formed by the thin-film resistance body 20.

The first temperature-compensation resistance body 22 is made of the same material as the thin-film resistance body 20. In addition, the first temperature-compensation resistance body 22 is formed on the substrate 12 by the same method as the thin-film resistance body 20.

The first temperature-compensation resistance body 22 has a first front-surface compensation extended portion 80 and a second front-surface compensation extended portion 82 that extends linearly from the first direction side 44 towards the second direction side 46 on the exposed portion 28 of the substrate 12. The first front-surface compensation extended portion 80 and the second front-surface compensation extended portion 82 are arranged apart from each other.

The first front-surface compensation extended portion 80 is arranged at a position closer to the first end portion 34 of the thin-film resistance body 20 than the second front-surface compensation extended portion 82. The second front-surface compensation extended portion 82 is arranged at a position closer to the second end portion 36 of the thin-film resistance body 20 than the first front-surface compensation extended portion 80.

The first temperature-compensation resistance body 22 has a front-surface compensation joining portion 84 that joins the second direction side 46 of the first front-surface compensation extended portion 80 and the second direction side 46 of the second front-surface compensation extended portion 82. The front-surface compensation joining portion 84 extends linearly along a boundary line 90 between the covered portion 27 and the exposed portion 28. With such a configuration, the first temperature-compensation resistance body 22 is formed to have a U-shape.

A third rectangular portion 92 having a rectangular shape is joined to an end portion of the first front-surface compensation extended portion 80 on the first direction side 44. A fourth rectangular portion 94 having a rectangular shape is joined to an end portion of the second front-surface compensation extended portion 82 on the first direction side 44.

A third electrode 96 having a rectangular shape is provided on the third rectangular portion 92 of the first temperature-compensation resistance body 22. The third electrode 96 is electrically connected to the third rectangular portion 92 and is arranged on the first direction side 44 of the substrate 12.

In addition, a fourth electrode 98 having a rectangular shape is provided on the fourth rectangular portion 94 of the first temperature-compensation resistance body 22. The fourth electrode 98 is electrically connected to the fourth rectangular portion 94 and is arranged on the first direction side 44 of the substrate 12.

The first front-surface compensation extended portion 80, the second front-surface compensation extended portion 82, and the front-surface compensation joining portion 84 are set to have substantially the same width dimension.

The width dimension of the first temperature-compensation resistance body 22 in a region from the first front-surface compensation extended portion 80 to the second front-surface compensation extended portion 82 is set to be narrower than the width dimension of the thin-film resistance body 20 in a region from the first thin-film extended portion 42 to the second thin-film extended portion 50. With such a configuration, the first temperature-compensation resistance body 22 and the thin-film resistance body 20 are set to have substantially the same resistance value.

Second Temperature-Compensation Resistance Body

The second temperature-compensation resistance body 26 is arranged on the back surface 24 that is the second surface of the substrate 12. The second temperature-compensation resistance body 26 exhibits the same behavior as the first temperature-compensation resistance body 22.

In this embodiment, the behavior means the change in the resistance value in response to temperature and the change in the resistance value in response to deformation of the resistance body, and the first temperature-compensation resistance body 22 and the second temperature-compensation resistance body 26 are set such that at least one of the behavior of the change in the resistance value in response to the temperature of the resistance body or its surroundings and the behavior of the change in the resistance value in response to the deformation of the resistance body becomes the same.

In this embodiment, at least one of the following configurations is set: a first configuration in which the setting is made such that the temperature coefficient of resistance of the first temperature-compensation resistance body 22 and the temperature coefficient of resistance of the second temperature-compensation resistance body 26 are equivalent, resulting in the same behavior of the change in the resistance value in response to the temperature change; and a second configuration in which, when the same deformation is applied, the setting is made such that the absolute value of the amount of change in the resistance value of the first temperature-compensation resistance body 22 and the absolute value of the amount of change in the resistance value of the second temperature-compensation resistance body 26 are equivalent, resulting in the same behavior of the absolute value of the amount of change in the resistance value.

In other words, the configuration that exhibits the same behavior includes at least one of: the first configuration in which the temperature coefficient of resistance of the first temperature-compensation resistance body 22 and the temperature coefficient of resistance of the second temperature-compensation resistance body 26 are set to be equivalent; and the second configuration in which, when the same deformation is applied, the absolute value of the amount of change in the resistance value of the first temperature-compensation resistance body 22 and the absolute value of the amount of change in the resistance value of the second temperature-compensation resistance body 26 are set to be equivalent.

In this embodiment, the temperature coefficient of resistance of the first temperature-compensation resistance body 22 and the temperature coefficient of resistance of the second temperature-compensation resistance body 26 are set to be equivalent, and the absolute values for the change in the resistance value of the first temperature-compensation resistance body 22 and the change in the resistance value of the second temperature-compensation resistance body 26 when the deformation is applied by the same load are set to be equivalent (i.e. with opposite positive/negative signs). As a result, the configuration allows the changes in the resistance value due to the temperature and the deformation to be observed as the same or equivalent behavior.

Note that the term "temperature coefficient of resistance" refers to a rate of change when the resistance value changes with a change in temperature.

The change in the resistance value of the first temperature-compensation resistance body 22 and the change in the resistance value of the second temperature-compensation resistance body 26 under the deformation by the same load are caused in different increase/decrease directions (polarities) of the resistance value. In the following, the reason why the increase/decrease direction (polarity) of the resistance value of the first temperature-compensation resistance body 22 and the increase/decrease direction (polarity) of the resistance value of the second temperature-compensation resistance body 26 are different will be explained.

When the pressure receiving surface 13 is pressed by the load, the substrate 12 sandwiched between the inorganic layer 16 and a mounting base (for example, a pedestal) to which the load sensor element 10 is attached is deformed so as to be bent in the load direction. When such a deformation is caused, in the substrate 12, the deformation is caused in the tensile direction in the first surface, and the deformation is caused in the compression direction in the opposite second surface.

At this time, the amount of deformation in the first surface and that in the opposite second surface are substantially the same. Therefore, with the first temperature-compensation resistance body 22 that is formed on the front surface 14 of the substrate 12 and the second temperature-compensation resistance body 26 that is formed on the back surface 24 of the substrate 12 exhibiting the same behavior, the changes in the resistance values will be substantially the same in terms of the absolute values, and the increase/decrease directions (polarities) of the resistance values will be different.

In addition, advantages of setting the temperature coefficient of resistance to be equivalent will be described.

The temperature-compensation resistance bodies 22 and 26 have substantially the same temperature coefficient of resistance. Therefore, by respectively arranging the temperature-compensation resistance bodies 22 and 26 on one side of a bridge circuit (in parallel or in series), it is possible to cancel out the amounts of change in the resistance values of the respective temperature-compensation resistance bodies 22 and 26 caused by the deformation of the substrate 12. As a result, it is possible to easily obtain the amount of change in the resistance value due to the temperature change without performing complicated circuit processing, etc.

The phrase "substantially the same temperature coefficient of resistance" refers to that the difference between the temperature coefficient of resistance of the first temperature-compensation resistance body 22 and the temperature coefficient of resistance of the second temperature-compensation resistance body 26 falls within a predetermined first range.

As an example, the first range is 100 ppm/K.

The phrase "the changes in the resistance values are equivalent" refers to that, after a predetermined same load is applied to each of the temperature-compensation resistance bodies 22 and 26, in other words, after the deformation of the front surface 14 and the back surface 24 of the substrate 12 caused by the application of the load to the pressure receiving region 30, the difference between the change in the resistance value caused in the first temperature-compensation resistance body 22 and the change in the resistance value caused in the second temperature-compensation resistance body 26 falls within a predetermined second range.

As an example, a predetermined same load is 10 kN. In addition, as an example, the second range is 100 ppm.

As described above, by providing the first temperature-compensation resistance body 22 on the front surface 14 of the substrate 12 and by providing the second temperature-compensation resistance body 26 that exhibits the same behavior as the first temperature-compensation resistance body 22 on the back surface 24, it is possible to reverse the polarity of the change in the resistance value when the substrate 12 is deformed.

The second temperature-compensation resistance body 26 is made of the same material as the thin-film resistance body 20 and the first temperature-compensation resistance body 22. In addition, the second temperature-compensation resistance body 26 is formed on the substrate 12 by the same method as the thin-film resistance body 20 and the first temperature-compensation resistance body 22.

The second temperature-compensation resistance body 26 is arranged on the back side of the location where the first temperature-compensation resistance body 22 is arranged. In addition, the second temperature-compensation resistance body 26 is formed to have substantially the same shape as the first temperature-compensation resistance body 22.

With such a configuration, the second temperature-compensation resistance body 26 is arranged at the position overlapping with the first temperature-compensation resistance body 22 in the thickness direction 100 of the substrate 12 (see FIGS. 1 and 2). In addition, the second temperature-compensation resistance body 26 is set so as to have substantially the same resistance value as the first temperature-compensation resistance body 22.

In this embodiment, the overlap of the second temperature-compensation resistance body 26 with the first temperature-compensation resistance body 22 does not exclude a case in which a non-overlapping region is formed at a part of an outer edge portion in a state in which the second temperature-compensation resistance body 26 is superimposed on the first temperature-compensation resistance body 22 in the thickness direction 100 of the substrate 12.

An example of the non-overlapping region is a region within 50%, preferably within 25% of the total area of the first temperature-compensation resistance body 22. If the non-overlapping region is small, the front surface 14 and the back surface 24 of the substrate 12 are in the same state, and so, it is possible to set the first temperature-compensation resistance body 22 and the second temperature-compensation resistance body 26 to have the same or similar behavior. Variations in the formation positions of the first temperature-compensation resistance body 22 and the second temperature-compensation resistance body 26 due to manufacturing are allowed.

The second temperature-compensation resistance body 26 is arranged in the region on the backside of the exposed portion 28.

The second temperature-compensation resistance body 26 has a first back-side compensation extended portion 110 that is arranged at the position overlapping with the first front-surface compensation extended portion 80 of the first temperature-compensation resistance body 22 in the thickness direction 100 of the substrate 12 and a second back-side compensation extended portion 112 that is arranged at the position overlapping with the second front-surface compensation extended portion 82 of the first temperature-compensation resistance body 22.

In addition, the second temperature-compensation resistance body 26 has a back-side compensation joining portion 114 that is arranged at the position overlapping with the front-surface compensation joining portion 84 of the first temperature-compensation resistance body 22 in the thickness direction 100 of the substrate 12 and a fifth rectangular portion 116 that is arranged at the position overlapping with the third rectangular portion 92.

Furthermore, the second temperature-compensation resistance body 26 has a sixth rectangular portion 118 that is arranged at the position overlapping with the fourth rectangular portion 94 of the first temperature-compensation resistance body 22 in the thickness direction 100 of the substrate 12.

A fifth electrode 120 having a rectangular shape is provided on the fifth rectangular portion 116 of the second temperature-compensation resistance body 26. The fifth electrode 120 is electrically connected to the fifth rectangular portion 116 and is arranged on the first direction side 44 of the substrate 12.

In addition, a sixth electrode 122 having a rectangular shape is provided on the sixth rectangular portion 118 of the second temperature-compensation resistance body 26. The sixth electrode 122 is electrically connected to the sixth rectangular portion 118 and is arranged on the first direction side 44 of the substrate 12.

With such a configuration, the resistance bodies 20, 22, and 26 respectively have the electrodes 70, 72, 96, 98, 120, and 122, each of which is electrically connected at its respective end portion.

The electrodes 70, 72, 96, 98, 120, and 122 are each made of a material such as, for example, copper (Cu), silver (Ag), gold (Au), and so forth.

The first back-side compensation extended portion 110, the second back-side compensation extended portion 112, and the back-side compensation joining portion 114 are set to have substantially the same width dimension.

The width dimension of a region of the second temperature-compensation resistance body 26 from the first back-side compensation extended portion 110 to the second back-side compensation extended portion 112 is set to be narrower than the width dimension of the region of the thin-film resistance body 20 from the first thin-film extended portion 42 to the second thin-film extended portion 50. With such a configuration, the second temperature-compensation resistance body 26 and the thin-film resistance body 20 are set to have substantially the same resistance value.

As shown in FIG. 1, a first lead wire 130 is connected to the first electrode 70 that is provided on the front surface 14 of the substrate 12. A second lead wire 132 is connected to the second electrode 72. A third lead wire 134 is connected to the third electrode 96. A fourth lead wire 136 is connected to the fourth electrode 98.

As shown in FIG. 2, a fifth lead wire 138 is connected to the fifth electrode 120 that is provided on the back surface 24 of the substrate 12. A sixth lead wire 140 is connected to the sixth electrode 122.

The lead wires 130, 132, 134, 136, 138, and 140 are electrically connected to corresponding electrodes 70, 72, 96, 98, 120, and 122 by a solder 142, respectively.

Each of the lead wires 130, 132, 134, 136, 138, and 140 is made of a material such as, for example, a copper (Cu)-based alloy, an iron (Fe)-based alloy, and so forth. Each of the lead wires 130, 132, 134, 136, 138, and 140 is formed of, for example, an uncovered conductive wire (plated with tin (Sn), etc.), a covered wire in which the conductive wire is covered by a covering, an enamel wire in which the conductive wire is covered with the insulating layer, or the like. In addition, a terminal formed of a flat lead frame may also be used.

Operations and Effects

Next, operational advantages achieved by the first embodiment will be described.

The load sensor element 10 in this embodiment is the load sensor element 10 for measuring the surface pressure load. The load sensor element 10 includes the substrate 12 and the inorganic layer 16 that has the pressure receiving surface 13 for receiving the load and that is provided to cover the part of the front surface 14 that is the first surface of the substrate 12. The load sensor element 10 includes the thin-film resistance body 20 that is formed of the resistance body whose resistance value is changed in response to the load received by the inorganic layer 16. The thin-film resistance body 20 has: the main body portion 32 that is sandwiched between the substrate 12 and the inorganic layer 16; and the first end portion 34 and the second end portion 36 that are both end portions arranged on the exposed portion 28 of the substrate 12 that is not covered by the inorganic layer 16. The load sensor element 10 includes the first temperature-compensation resistance body 22 that is independent from the thin-film resistance body 20 and that is arranged on the exposed portion 28 of the front surface 14 that is the first surface of the substrate 12. The load sensor element 10 includes the second temperature-compensation resistance body 26 that is arranged on the back surface 24, which is the second surface of the substrate 12, and that exhibits the same behavior as the first temperature-compensation resistance body 22.

The configuration that exhibits the same behavior includes at least one of: the first configuration in which the temperature coefficient of resistance of the first temperature-compensation resistance body and the temperature coefficient of resistance of the second temperature-compensation resistance body are set to be equivalent; and the second configuration in which, when the same deformation is applied, the absolute value of the amount of change in the resistance value of the first temperature-compensation resistance body and the absolute value of the amount of change in the resistance value of the second temperature-compensation resistance body are set to be equivalent.

In this configuration, when the substrate 12 is deformed by the load received by the inorganic layer 16, in the first temperature-compensation resistance body 22 that is provided on the front surface 14 of the substrate 12 and in the second temperature-compensation resistance body 26 that is provided on the back surface 24 of the substrate 12, the changes in the resistance values are caused in opposite polarities to each other.

Specifically, when the substrate 12 is deformed by the load received by the inorganic layer 16, if, for example, the resistance value of the first temperature-compensation resistance body 22 is increased, the resistance value of the second temperature-compensation resistance body 26 is decreased.

Therefore, by using the resistance value indicated by the first temperature-compensation resistance body 22 and the resistance value indicated by the second temperature-compensation resistance body 26, it is possible to cancel out the change in the resistance value caused by the deformation of the substrate 12. As a result, it becomes possible to acquire a change component of the resistance value depending on the environmental temperature.

Therefore, in the load sensor element 10 for measuring the surface pressure load, it is possible to improve the temperature compensation accuracy by suppressing the influence caused by the deformation of the substrate 12.

Note that as a method of cancelling the change in the resistance value caused by the deformation of the substrate 12 by using the first temperature-compensation resistance body 22 and the second temperature-compensation resistance body 26, for example, a method of connecting the first temperature-compensation resistance body 22 and the second temperature-compensation resistance body 26 in series or in parallel can be mentioned.

In the load sensor element 10 of this embodiment, the first temperature-compensation resistance body 22 and the second temperature-compensation resistance body 26 have substantially the same shape and are arranged at positions overlapping with each other in the thickness direction of the substrate 12.

In this configuration, the resistance value indicated by the first temperature-compensation resistance body 22 and the resistance value indicated by the second temperature-compensation resistance body 26, when the substrate 12 is deformed by the load received by the inorganic layer 16, can be made closer to each other.

Second Embodiment

A load sensor element 200 according to a second embodiment will be described with reference to FIGS. 5 and 6. In this embodiment, components that are the same as or equivalent to those in the first embodiment are assigned the same reference numerals as the first embodiment, and a description thereof shall be omitted and only differences from those in the first embodiment will be described.

Figure 5:
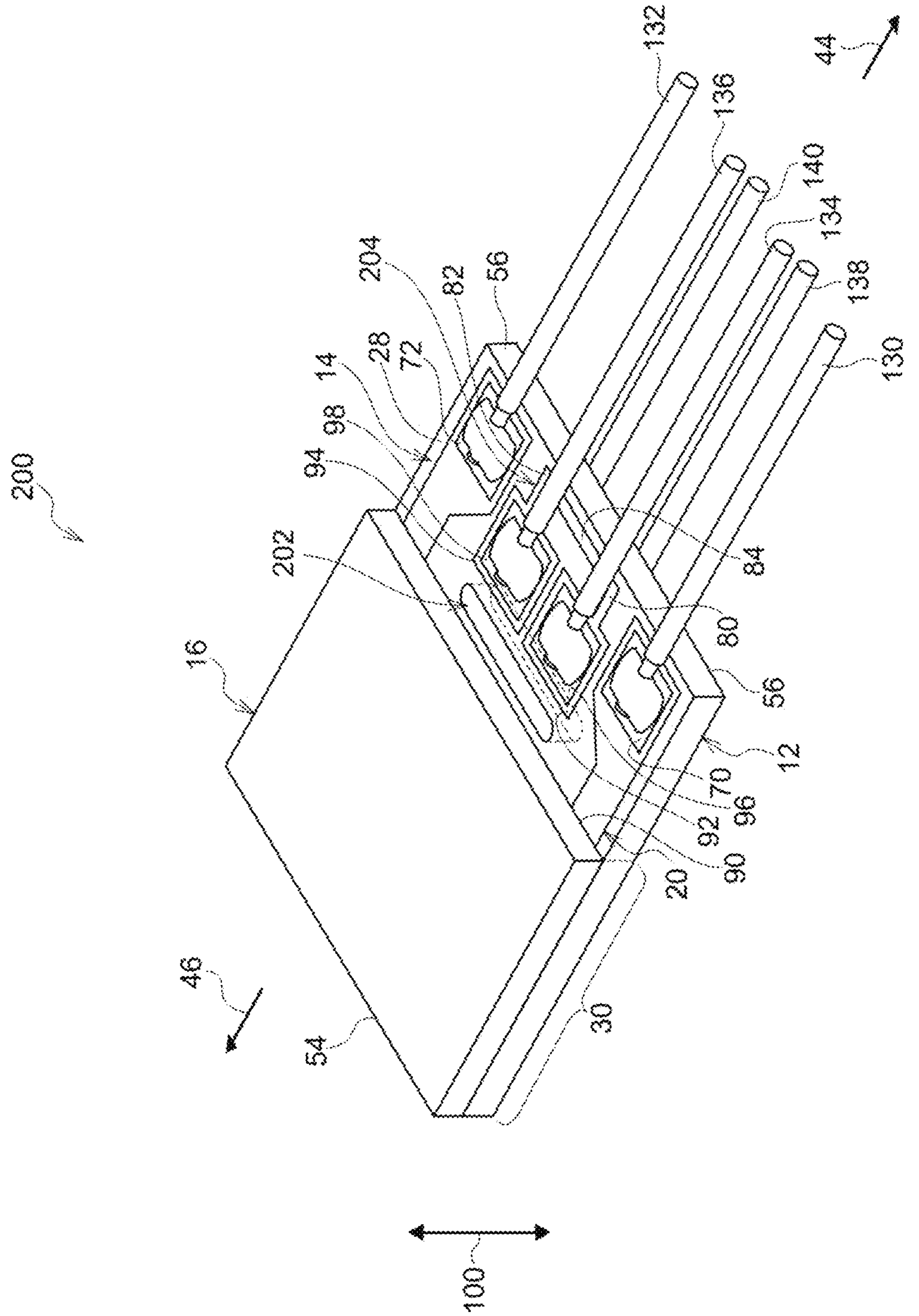
FIG. 5 is a perspective view of the load sensor element according to a second embodiment viewed from the front surface side.

FIG. 5 is a perspective view of the load sensor element 200 according to the second embodiment viewed from the front surface 14 side. FIG. 6 is a perspective view of the load sensor element 200 according to the second embodiment viewed from the back surface 24 side.

Compared with the first embodiment, the load sensor element 200 according to the second embodiment is different in that a hole 202 is formed in the substrate 12. In addition, compared with the first embodiment, the load sensor element 200 according to the second embodiment is different in the arrangement of a first temperature-compensation resistance body 204 and the arrangement of a second temperature-compensation resistance body 206.

First Temperature-Compensation Resistance Body

The first temperature-compensation resistance body 204 has the first front-surface compensation extended portion 80 and the second front-surface compensation extended portion 82 that extend linearly from the first direction side 44 towards the second direction side 46 on the exposed portion 28 of the substrate 12.

The first temperature-compensation resistance body 204 has the front-surface compensation joining portion 84 that joins the first direction side 44 of the first front-surface compensation extended portion 80 and the first direction side 44 of the second front-surface compensation extended portion 82. The front-surface compensation joining portion 84 of the first temperature-compensation resistance body 204 extends linearly along the first end edge 56 of the substrate 12.

The third rectangular portion 92 having a rectangular shape is joined to an end portion of the first front-surface compensation extended portion 80 on the second direction side 46. The fourth rectangular portion 94 having a rectangular shape is joined to an end portion of the second front-surface compensation extended portion 82 on the second direction side 46.

The third electrode 96 is provided on the third rectangular portion 92 of the first temperature-compensation resistance body 204. The fourth electrode 98 is provided on the fourth rectangular portion 94 of the first temperature-compensation resistance body 204.

The first direction side 44 of the first front-surface compensation extended portion 80 of the first temperature-compensation resistance body 204 and the first direction side 44 of the second front-surface compensation extended portion 82 of the first temperature-compensation resistance body 204 are joined by the front-surface compensation joining portion 84. The front-surface compensation joining portion 84 extends linearly along the first end edge 56 of the substrate 12. With such a configuration, the front-surface compensation joining portion 84 is arranged on the first direction side 44 of the hole 202.

With such a configuration, a region of the first temperature-compensation resistance body 204 from a first end portion in which the third electrode 96 is provided to a second end portion in which the fourth electrode 98 is provided is arranged at the location further away from the thin-film resistance body 20 than the third electrode 96 and the fourth electrode 98. In addition, in the first temperature-compensation resistance body 204, the region from the first end portion in which the third electrode 96 is provided to the second end portion in which the fourth electrode 98 is provided is provided so as to avoid the hole 202.

Second Temperature-Compensation Resistance Body

Figure 6:
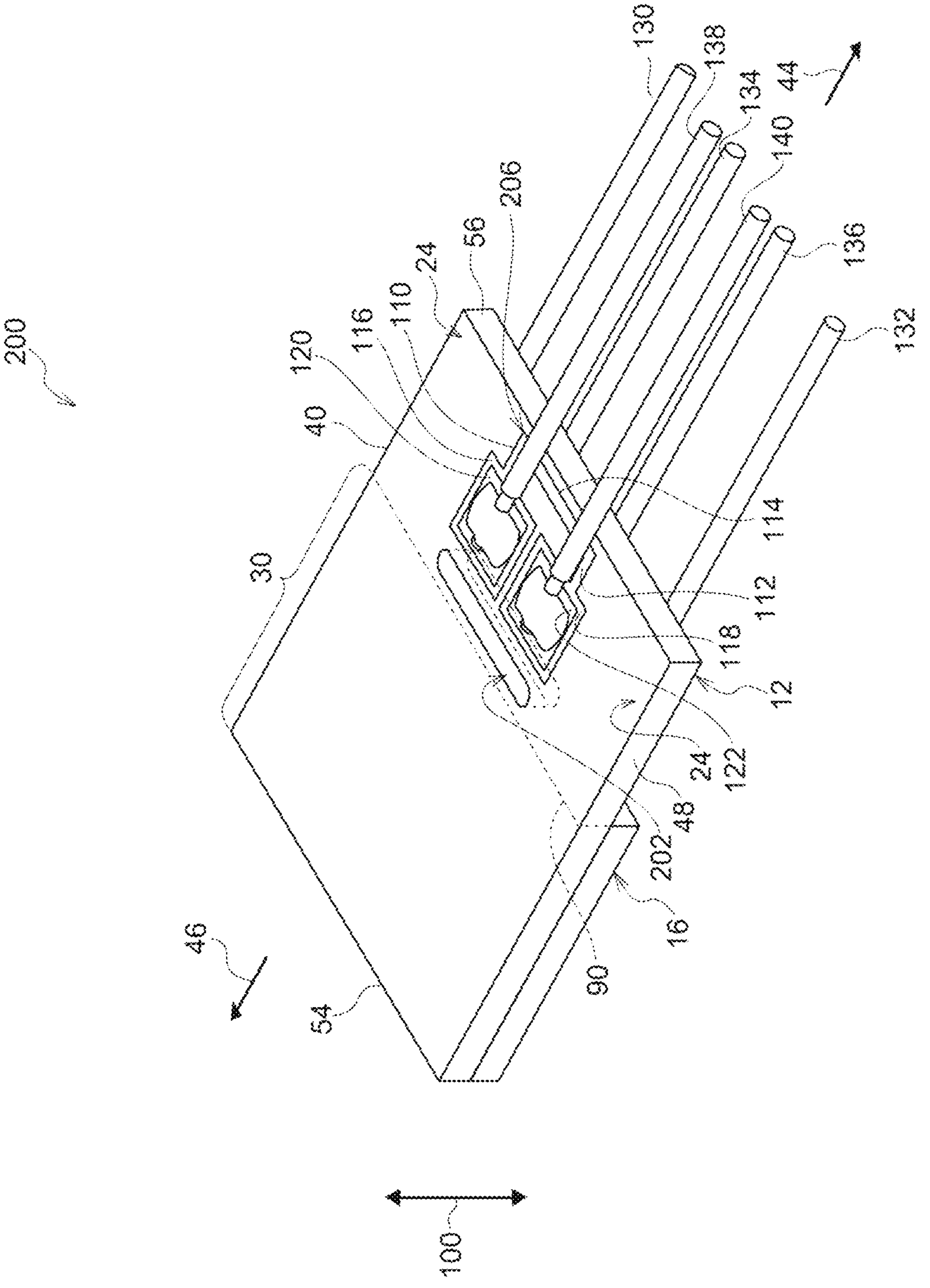
FIG. 6 is a perspective view of the load sensor element according to the second embodiment viewed from the back surface side.

As shown in FIG. 6, the second temperature-compensation resistance body 206 has the first back-side compensation extended portion 110 that is arranged at the position overlapping with the first front-surface compensation extended portion 80 of the first temperature-compensation resistance body 204 in the thickness direction 100 of the substrate 12. The second temperature-compensation resistance body 206 has the second back-side compensation extended portion 112 that is arranged at the position overlapping with the second front-surface compensation extended portion 82.

In addition, the second temperature-compensation resistance body 206 has the back-side compensation joining portion 114 that is arranged at the position overlapping with the front-surface compensation joining portion 84 of the first temperature-compensation resistance body 204 in the thickness direction 100 of the substrate 12.

Furthermore, the second temperature-compensation resistance body 206 has: the fifth rectangular portion 116 that is arranged at the position overlapping with the third rectangular portion 92 of the first temperature-compensation resistance body 204 in the thickness direction 100 of the substrate 12; and the sixth rectangular portion 118 that is arranged at the position overlapping with the fourth rectangular portion 94 of the first temperature-compensation resistance body 204.

The fifth electrode 120 is provided on the fifth rectangular portion 116 of the second temperature-compensation resistance body 206. The sixth electrode 122 is provided on the sixth rectangular portion 118 of the second temperature-compensation resistance body 206.

The first direction side 44 of the first back-side compensation extended portion 110 of the second temperature-compensation resistance body 206 and the first direction side 44 of the second back-side compensation extended portion 112 of the second temperature-compensation resistance body 206 are joined by the back-side compensation joining portion 114. The back-side compensation joining portion 114 of the second temperature-compensation resistance body 206 extends linearly along the first end edge 56 of the substrate 12. With such a configuration, the back-side compensation joining portion 114 is arranged on the first direction side 44 of the hole 202.

In addition, a region of the second temperature-compensation resistance body 206 from the first end portion in which the fifth electrode 120 is provided to the second end portion in which the sixth electrode 122 is provided is arranged at the location further away from the main body portion 32 of the thin-film resistance body 20 (see FIG. 3) than the fifth electrode 120 and the sixth electrode 122. Furthermore, a region of the second temperature-compensation resistance body 206 from the first end portion in which the fifth electrode 120 is provided to the second end portion in which the sixth electrode 122 is provided is provided so as to avoid the hole 202.

For the lead wires 130, 132, 134, 136, 138, and 140 respectively connected to the electrodes 70, 72, 96, 98, 120, and 122, a covered wire in which the conductive wire is covered by a covering, an enamel wire in which the conductive wire is covered with the insulating layer, or the like is used.

Hole

The substrate 12 of the load sensor element 200 has the hole 202 serving as a deformation suppressing portion between the pressure receiving region 30, with which the inorganic layer 16 is overlapped in the thickness direction 100 of the substrate 12, and the first temperature-compensation resistance body 204, and between the pressure receiving region 30 and the second temperature-compensation resistance body 206.

In the second embodiment, the deformation suppressing portion may be a through hole or a bottomed hole having a bottom. In addition, the deformation suppressing portion may be a penetrating groove or a groove having a bottom.

For the deformation suppressing portion, it suffices that it suppresses the transmission of the deformation caused in the pressure receiving region 30 to a region of the substrate 12 in which the first temperature-compensation resistance body 204 and the second temperature-compensation resistance body 206 are provided when the substrate 12 is deformed by the load from the inorganic layer 16.

Specifically, the hole 202 is formed between the pressure receiving region 30 and the third rectangular portion 92 and the fourth rectangular portion 94 of the first temperature-compensation resistance body 204.

The hole 202 extends along the boundary line 90 between the covered portion 27 (see FIG. 3) and the exposed portion 28. The hole 202 may be formed by, for example, using a mold for forming the substrate 12 or a laser for processing the substrate 12.

The hole 202 is formed by a slit penetrating through the substrate 12. With such a configuration, the hole 202 opens, in the back surface 24 of the substrate 12, between the pressure receiving region 30 and the fifth rectangular portion 116 and the sixth rectangular portion 118 of the second temperature-compensation resistance body 206.

In this embodiment, although a description will be given of a case in which the hole 202 serving as the deformation suppressing portion is formed by the slit penetrating through the substrate 12, this embodiment is not limited thereto. For example, instead of the hole 202 serving as the deformation suppressing portion, a groove may also be employed.

In a case in which the groove is used instead of the hole 202, the groove may be formed on either one of the front surface 14 of the substrate 12 or the back surface 24, or the groove may be formed on both of the front surface 14 and the back surface 24 of the substrate 12. In order to make the behaviors of the first temperature-compensation resistance body 204 on the front surface 14 and the second temperature-compensation resistance body 206 on the back surface 24 of the substrate 12 substantially the same, it is desirable to form the grooves in both of the front surface and the back surface 24 of the substrate 12. In a case in which the grooves are formed in the front surface 14 and the back surface 24 of the substrate 12, in order to make the states of both surfaces substantially the same, it is desirable to form both grooves at positions overlapping with each other in the thickness direction 100 of the substrate 12 and to form both grooves so as to have substantially the same depth and substantially the same length dimension.

Operations and Effects

Next, operational advantages achieved by the second embodiment will be described.

Also in the load sensor element 200 of this embodiment, for components that are the same as or equivalent to those in the first embodiment, it is possible to achieve operational advantages similar to those of the first embodiment.

In the load sensor element 200 of this embodiment, the substrate 12 has the hole 202 serving as the deformation suppressing portion in at least one of: between the pressure receiving region 30, with which the inorganic layer 16 is overlapped in the thickness direction 100 of the substrate 12, and the first temperature-compensation resistance body 204; or between the pressure receiving region 30 and the second temperature-compensation resistance body 206.

In this configuration, when the substrate 12 is deformed by the load received by the inorganic layer 16, it is possible to suppress, by the hole 202, the transmission of the deformation caused in the pressure receiving region 30 to the first temperature-compensation resistance body 204 and the second temperature-compensation resistance body 206.

As a result, it is possible to reduce the influence of the load received by the inorganic layer 16 on the first temperature-compensation resistance body 204 and the second temperature-compensation resistance body 206. Therefore, it becomes possible to improve the temperature compensation accuracy using the compensation resistance bodies 204 and 206. Especially, when the hole 202 is the slit penetrating through the substrate 12, because a space is provided at a part between the pressure receiving region 30 and the exposed portion 28 of the substrate 12 in which the first temperature-compensation resistance body 204 and the second temperature-compensation resistance body 206 are formed, the influence of the load is further reduced.

In addition, when the hole 202 is the slit penetrating through the substrate 12, because the position of the hole 202 in the front surface 14 of the substrate 12 and the position of the hole 202 in the back surface 24 become the same, it is not required to perform alignment and the manufacturing is easy.

In addition, in the load sensor element 200 of this embodiment, the load sensor element 10 includes the first electrode 70 that is electrically connected to the first end portion 34 of the thin-film resistance body 20 and that is provided on the first direction side 44 that is the first side of the substrate 12. The load sensor element 10 includes the second electrode 72 that is electrically connected to the second end portion 36 of the thin-film resistance body 20 and that is provided on the first direction side 44 that is the first side of the substrate. The load sensor element 10 includes the third electrode 96 that is electrically connected to the first end portion of the first temperature-compensation resistance body 22 and that is provided on the first direction side 44 that is the first side of the substrate 12. The load sensor element 10 includes the fourth electrode 98 that is electrically connected to the second end portion of the first temperature-compensation resistance body 22 and is provided on the first direction side 44 that is the first side of the substrate 12. The load sensor element 10 includes the fifth electrode 120 that is electrically connected to the first end portion of the second temperature-compensation resistance body 26 and that is provided on the first direction side 44 that is the first side of the substrate 12. The load sensor element 10 includes the sixth electrode 122 that is electrically connected to the second end portion of the second temperature-compensation resistance body 26 and that is provided on the first direction side 44 that is the first side of the substrate 12.

A region of the first temperature-compensation resistance body 204 from the first end portion in which the third electrode 96 is provided to the second end portion in which the fourth electrode 98 is provided is arranged at the location further away from the thin-film resistance body 20 than the third electrode 96 and the fourth electrode 98. A region of the second temperature-compensation resistance body 206 from the first end portion in which the fifth electrode 120 is provided to the second end portion in which the sixth electrode 122 is provided is arranged at the location further away from the thin-film resistance body 20 than the fifth electrode 120 and the sixth electrode 122.

With this configuration, it is possible to reduce the influence of the load received by the inorganic layer 16 on the first temperature-compensation resistance body 204 and the second temperature-compensation resistance body 206. As a result, it becomes possible to further improve the temperature compensation accuracy using the temperature-compensation resistance bodies 204 and 206.

Third Embodiment

A load sensor element 300 according to a third embodiment will be described with reference to FIGS. 7 and 8. In this embodiment, components that are the same as or equivalent to those in the first embodiment are assigned the same reference numerals as the first embodiment, and a description thereof shall be omitted and only differences from those in the first embodiment will be described.

Figure 7:
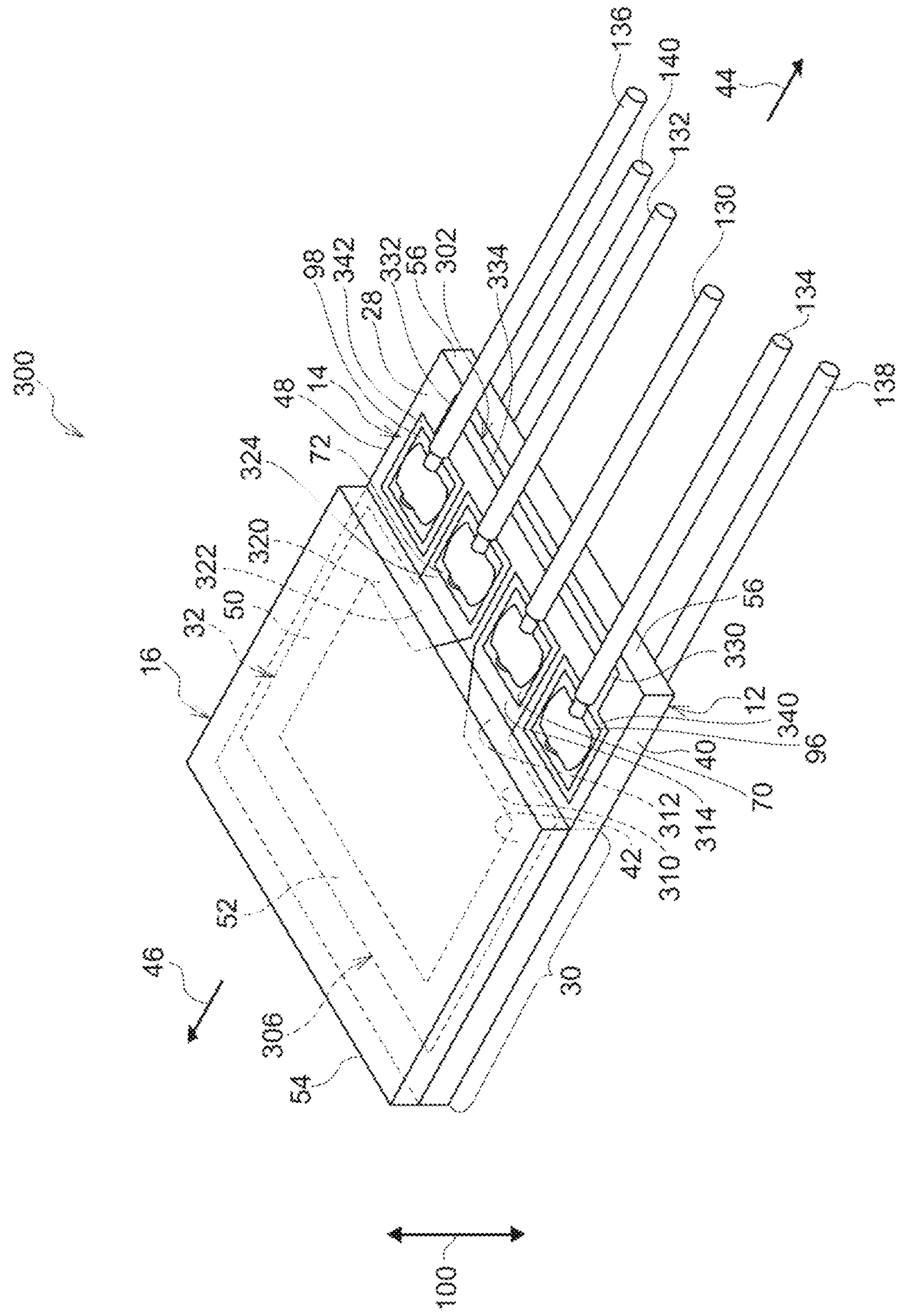
FIG. 7 is a perspective view of the load sensor element according to a third embodiment viewed from the front surface side.

FIG. 7 is a perspective view of the load sensor element 300 according to the third embodiment viewed from the front surface 14 side. FIG. 8 is a perspective view of the load sensor element 300 according to the third embodiment viewed from the back surface 24 side.

Compared with the first embodiment, the load sensor element 300 according to the third embodiment is different in the arrangement of a first temperature-compensation resistance body 302 and the arrangement of a second temperature-compensation resistance body 304. In addition, compared with the first embodiment, the load sensor element 300 according to the third embodiment is different in the shape of a thin-film resistance body 306.

Thin-Layer Resistance Body

The thin-film resistance body 306 has: the first thin-film extended portion 42 that extends along the first side edge 40 of the substrate 12; the second thin-film extended portion 50 that extends along the second side edge 48 of the substrate 12; and the thin-film joining portion 52 that joins the first thin-film extended portion 42 and the second thin-film extended portion 50.

A first extending portion 310 that extends towards the second side edge 48 of the substrate 12 is joined to an end portion of the first thin-film extended portion 42 on the first direction side 44. A first-edge-side widening portion 312 whose width dimension is increased towards the first end edge 56 of the substrate 12 is joined to an end portion of the first extending portion 310. A first rectangular portion 314 having a rectangular shape is joined to the first-edge-side widening portion 312. The first electrode 70 is provided on the first rectangular portion 314.

A second extending portion 320 that extends towards the first side edge 40 of the substrate 12 is joined to an end portion of the second thin-film extended portion 50 on the first direction side 44. A second-edge-side widening portion 322 whose width dimension is increased towards the first end edge 56 of the substrate 12 is joined to an end portion of the second extending portion 320. A second rectangular portion 324 having a rectangular shape is joined to the second-edge-side widening portion 322. The second electrode 72 is provided on the second rectangular portion 324.

In the thin-film resistance body 306, the thin-film joining portion 52, the first thin-film extended portion 42, the first extending portion 310, a part of the first-edge-side widening portion 312, the second thin-film extended portion 50, the second extending portion 320, and a part of the second-edge-side widening portion 322 form the main body portion 32 that is covered by the inorganic layer 16.

The part of the first-edge-side widening portion 312 and the first rectangular portion 314 form the first end portion that is not covered by the inorganic layer 16. In addition, the part of the second-edge-side widening portion 322 and the second rectangular portion 324 form the second end portion that is not covered by the inorganic layer 16.

First Temperature-Compensation Resistance Body

The first temperature-compensation resistance body 302 has a first front-surface compensation extended portion 330 and a second front-surface compensation extended portion 332 that extend linearly from the first direction side 44 towards the second direction side 46 on the exposed portion 28 of the substrate 12.

In the first temperature-compensation resistance body 302, the first direction side 44 of the first front-surface compensation extended portion 330 and the first direction side 44 of the second front-surface compensation extended portion 332 are joined by a front-surface compensation joining portion 334. The front-surface compensation joining portion 334 of the first temperature-compensation resistance body 302 extends linearly along the first end edge 56 of the substrate 12.

A third rectangular portion 340 having a rectangular shape is joined to an end portion of the first front-surface compensation extended portion 330 on the second direction side 46. The third rectangular portion 340 is provided between the first rectangular portion 314 and the first side edge 40 of the substrate 12. The third electrode 96 is provided on the third rectangular portion 340.

A fourth rectangular portion 342 having a rectangular shape is joined to an end portion of the second front-surface compensation extended portion 332 on the second direction side 46. The fourth rectangular portion 342 is provided between the second rectangular portion 324 and the second side edge 48 of the substrate 12. The fourth electrode 98 is provided on the fourth rectangular portion 342.

With such a configuration, a region of the first temperature-compensation resistance body 302 from the first end portion in which the third electrode 96 is provided to the second end portion in which the fourth electrode 98 is provided is arranged at the location further away from the thin-film resistance body 306 than the third electrode 96 and the fourth electrode 98.

Second Temperature-Compensation Resistance Body

Figure 8:
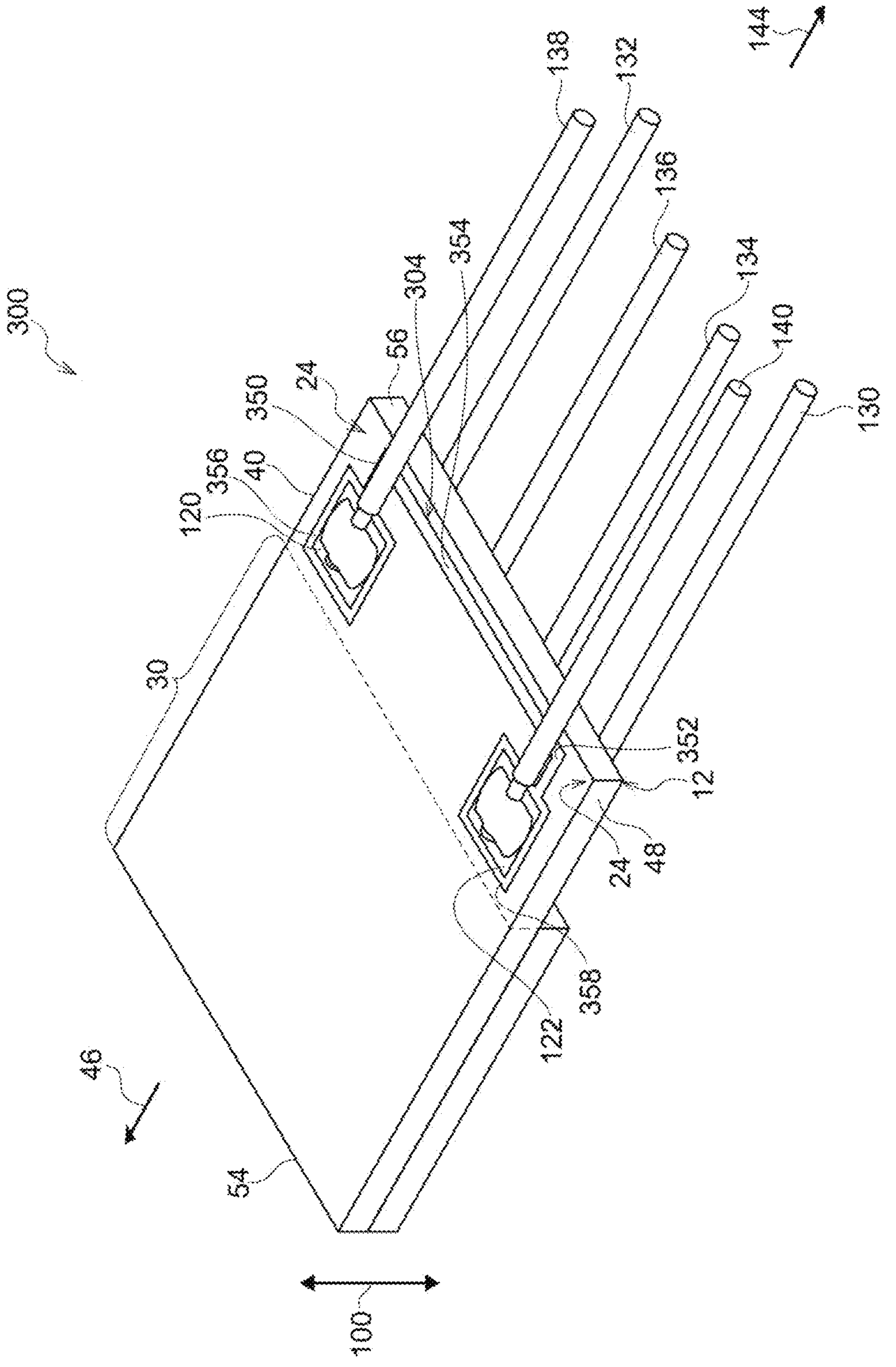
FIG. 8 is a perspective view of the load sensor element according to the third embodiment viewed from the back surface side.

As shown in FIG. 8, the second temperature-compensation resistance body 304 has a first back-side compensation extended portion 350 that is arranged at the position overlapping with the first front-surface compensation extended portion 330 of the first temperature-compensation resistance body 302 in the thickness direction 100 of the substrate 12. The second temperature-compensation resistance body 304 has a second back-side compensation extended portion 352 that is arranged at the position overlapping with the second front-surface compensation extended portion 332.

In addition, the second temperature-compensation resistance body 304 has: a back-side compensation joining portion 354 that is arranged at the position overlapping with the front-surface compensation joining portion 334 of the first temperature-compensation resistance body 302 in the thickness direction 100 of the substrate 12; and a fifth rectangular portion 356 that is arranged at the position overlapping with the third rectangular portion 340.

Furthermore, the second temperature-compensation resistance body 304 has a sixth rectangular portion 358 that is arranged at the position overlapping with the fourth rectangular portion 342 of the first temperature-compensation resistance body 302 in the thickness direction 100 of the substrate 12.

The fifth electrode 120 is provided on the fifth rectangular portion 356 of the second temperature-compensation resistance body 304. The sixth electrode 122 is provided on the sixth rectangular portion 358 of the second temperature-compensation resistance body 304.

With such a configuration, a region of the second temperature-compensation resistance body 304 from the first end portion in which the fifth electrode 120 is provided to the second end portion in which the sixth electrode 122 is provided is arranged at the location further away from the thin-film resistance body 306 than the fifth electrode 120 and the sixth electrode 122.

For the lead wires 130, 132, 134, 136, 138, and 140 respectively connected to the electrodes 70, 72, 96, 98, 120, and 122, a covered wire in which the conductive wire is covered by a covering, an enamel wire in which the conductive wire is covered with the insulating layer, or the like is used.

Operations and Effects

Next, operational advantages achieved by the third embodiment will be described.

Also in the load sensor element 300 of this embodiment, for components that are the same as or equivalent to those in the first embodiment, it is possible to achieve operational advantages similar to those of the first embodiment.

In addition, in the load sensor element 300 of this embodiment, the region of the first temperature-compensation resistance body 302 from the first end portion in which the third electrode 96 is provided to the second end portion in which the fourth electrode 98 is provided is arranged at the location further away from the thin-film resistance body 306 than the third electrode 96 and the fourth electrode 98. The region of the second temperature-compensation resistance body 304 from the first end portion in which the fifth electrode 120 is provided to the second end portion in which the sixth electrode 122 is provided is arranged at the location further away from the thin-film resistance body 306 than the fifth electrode 120 and the sixth electrode 122.

With this configuration, similarly to the second embodiment, it is possible to reduce the influence of the load received by the inorganic layer 16 on the first temperature-compensation resistance body 302 and the second temperature-compensation resistance body 304. This is because a distance from the pressure receiving region 30 to the first temperature-compensation resistance body 302 and the second temperature-compensation resistance body 304 is increased. As a result, it becomes possible to further improve the temperature compensation accuracy using the temperature-compensation resistance bodies 302 and 304.

In addition, in the load sensor element 300 of this embodiment, compared with the load sensor element 200 of the second embodiment, it is possible to make the front-surface compensation joining portion 334 of the first temperature-compensation resistance body 302 and the back-side compensation joining portion 354 of the second temperature-compensation resistance body 304 longer.

With such a configuration, in realizing a high resistance value, compared with the first temperature-compensation resistance body 22 and the second temperature-compensation resistance body 26 of the second embodiment, it is possible to increase the width dimensions of the first temperature-compensation resistance body 302 and the second temperature-compensation resistance body 304. In addition, in a case in which the width dimension of the first temperature-compensation resistance body 302 and the width dimension of the second temperature-compensation resistance body 304 are set to have the same dimensions as the first temperature-compensation resistance body 22 and the second temperature-compensation resistance body 26 of the second embodiment, it is possible to make the resistance value higher than that for each of the temperature-compensation resistance bodies 22 and 26.

By increasing the resistance value of each resistance body, it is possible to reduce the power consumption of the circuit constituted by each resistance body. In addition, by expanding the range of the resistance values capable of being manufactured, it is possible to provide a wide variety of products with different resistance values, contributing to an improvement in the degree of freedom in circuit design.

In addition, the first temperature-compensation resistance body 302 and the second temperature-compensation resistance body 304 are arranged at the positions away from the pressure receiving region 30. Therefore, it is possible to suppress the influence of the deformation caused in the pressure receiving region 30 on the first temperature-compensation resistance body 302 and the second temperature-compensation resistance body 304.

Fourth Embodiment

A load sensor element 400 according to a fourth embodiment will be described with reference to FIGS. 9 and 10. In this embodiment, components that are the same as or equivalent to those in the third embodiment are assigned the same reference numerals as the third embodiment, and a description thereof shall be omitted and only differences from those in the third embodiment will be described.

Figure 9:
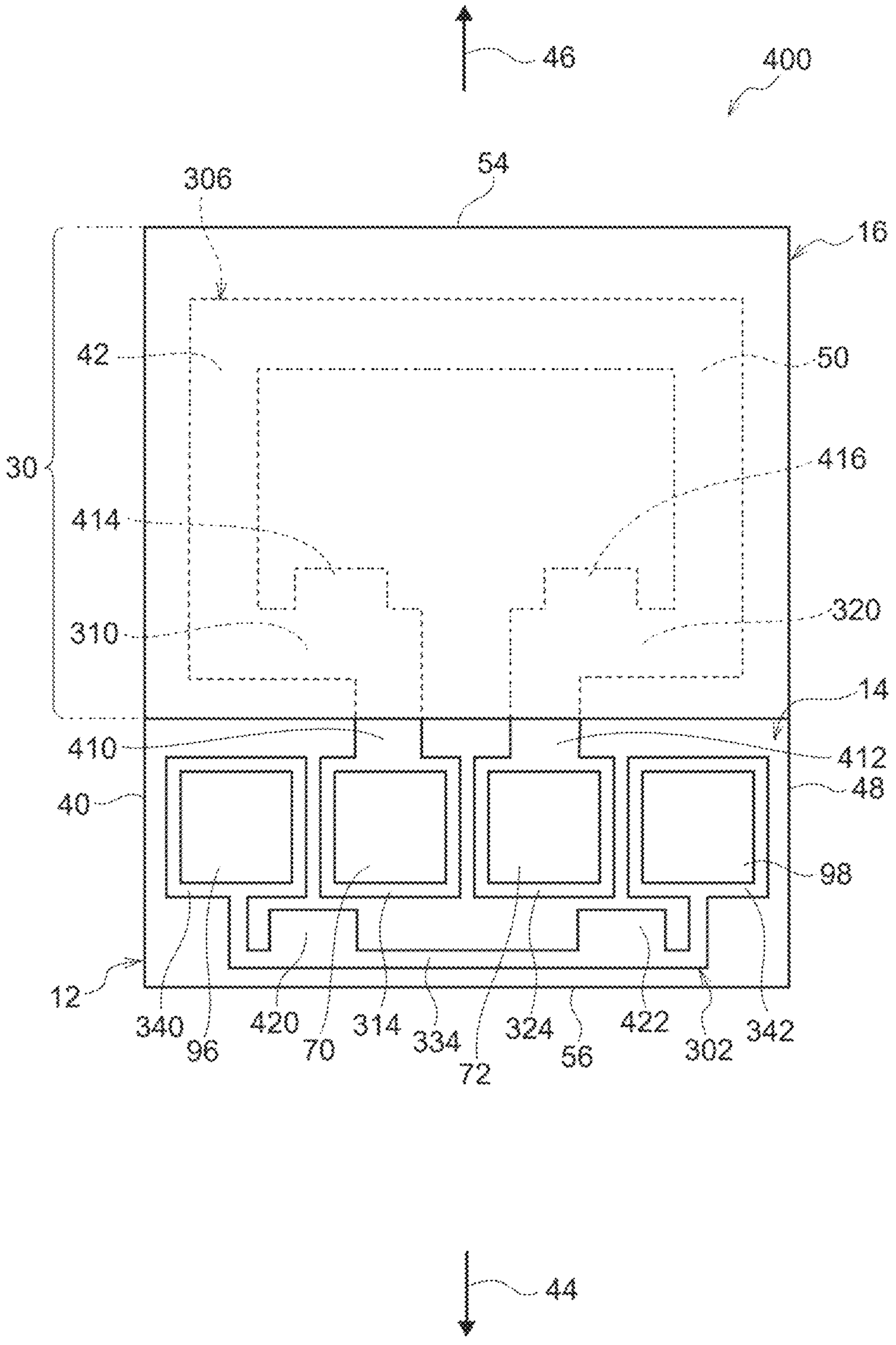
FIG. 9 is a diagram showing the load sensor element according to a fourth embodiment, and is a plan view showing a state in which the load sensor element, from which respective leads are removed, is viewed from the front surface side.

FIG. 9 is a diagram showing the load sensor element 400 according to the fourth embodiment, and is a plan view showing a state in which the load sensor element 400, from which respective leads are removed, is viewed from the front surface 14 side. FIG. 10 a diagram showing the load sensor element 400 according to the fourth embodiment, and is a plan view showing a state in which the load sensor element 400, from which respective leads are removed, is viewed from the back surface 24 side.

Compared with the third embodiment, the load sensor element 400 according to the fourth embodiment is different in that the thin-film resistance body 306, the first temperature-compensation resistance body 302, and the second temperature-compensation resistance body 304 have adjustment portions for adjusting the resistance value.

Thin-Layer Resistance Body

As shown in FIG. 9, in the thin-film resistance body 306, the first extending portion 310 and the first rectangular portion 314 are linked by a linear first linkage portion 410. In the thin-film resistance body 306, the second extending portion 320 and the second rectangular portion 324 are linked by a linear second linkage portion 412.

The first extending portion 310 is integrally formed with a rectangular first adjustment portion 414 that is projected towards the second end edge 54 side of the substrate 12. The second extending portion 320 is integrally formed with a rectangular second adjustment portion 416 that is projected towards the second end edge 54 side of the substrate 12.

First Temperature-Compensation Resistance Body

In the first temperature-compensation resistance body 302, a rectangular third adjustment portion 420 and a rectangular fourth adjustment portion 422 that are projected towards the second end edge 54 side of the substrate 12 are integrally formed on the front-surface compensation joining portion 334. In the front-surface compensation joining portion 334, the third adjustment portion 420 is arranged at the position closer to the third rectangular portion 340 than the fourth adjustment portion 422.

Second Temperature-Compensation Resistance Body

Figure 10:
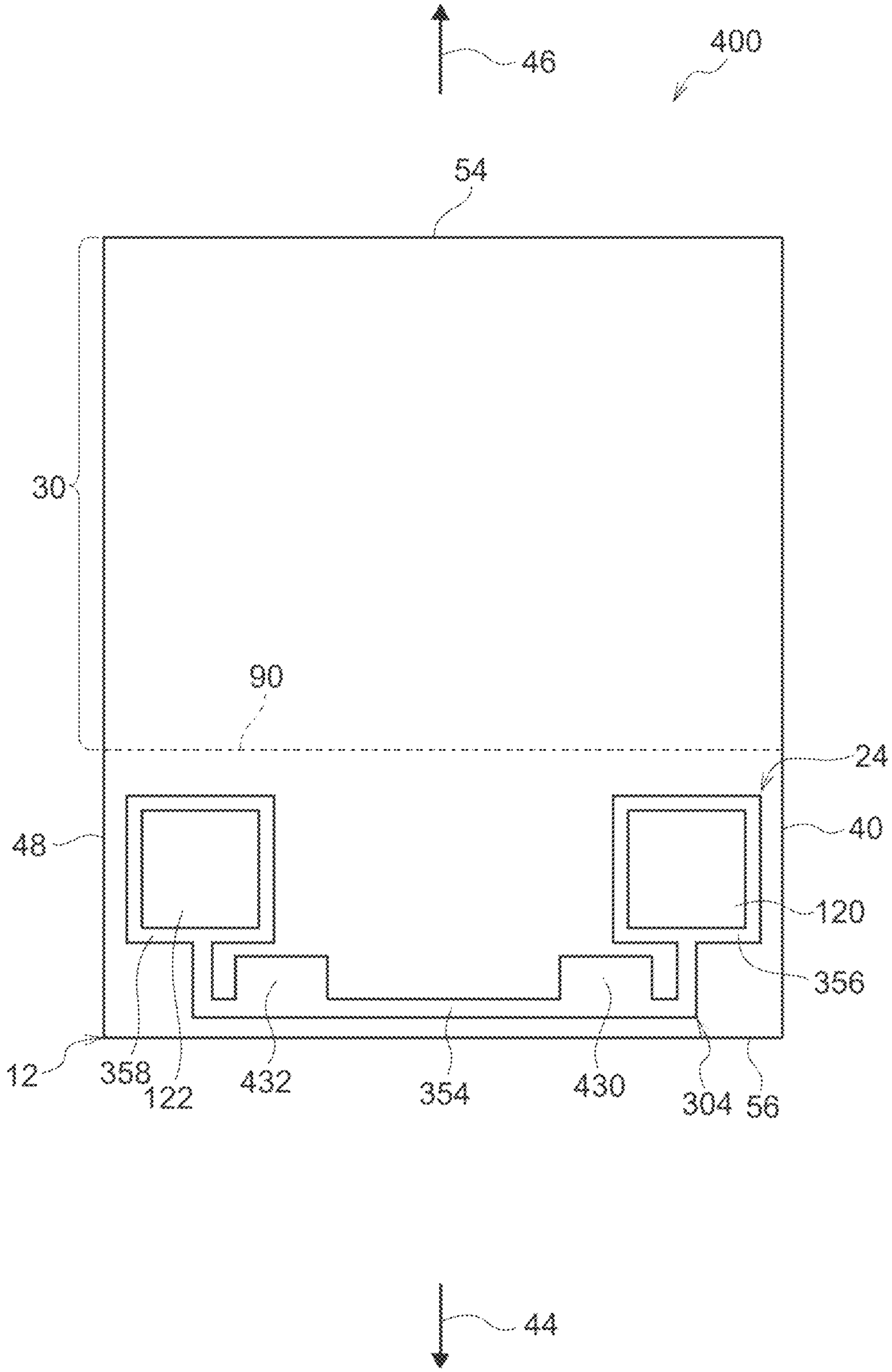
FIG. 10 is a diagram showing the load sensor element according to the fourth embodiment, and is a plan view showing a state in which the load sensor element, from which respective leads are removed, is viewed from the back surface side.

As shown in FIG. 10, on the back-side compensation joining portion 354 of the second temperature-compensation resistance body 304, a rectangular fifth adjustment portion 430 and a rectangular sixth adjustment portion 432 that are projected towards the second end edge 54 side of the substrate 12 are integrally formed. In the back-side compensation joining portion 354, the fifth adjustment portion 430 is arranged at the position closer to the fifth rectangular portion 356 than the sixth adjustment portion 432.

In this embodiment, although a description has been given of a case in which the front-surface compensation joining portion 334 of the first temperature-compensation resistance body 302 and the back-side compensation joining portion 354 of the second temperature-compensation resistance body 304 are respectively provided with the adjustment portion 420, 422, 430, and 432, this embodiment is not limited thereto. For example, the adjustment portion for adjusting the resistance value may be provided on at least one of the first temperature-compensation resistance body 302 or the second temperature-compensation resistance body 304.

Operations and Effects

Next, operational advantages achieved by the fourth embodiment will be described.

Also in the load sensor element 400 of this embodiment, for components that are the same as or equivalent to those in the third embodiment, it is possible to achieve operational advantages similar to those of the third embodiment.

In addition, in the load sensor element 400 of this embodiment, at least one of the first temperature-compensation resistance body 302 or the second temperature-compensation resistance body 304 has/have the adjustment portion(s) 420, 422, 430, 432 for adjusting the resistance value.

In the fourth embodiment, it is possible to adjust the resistance value of the first temperature-compensation resistance body 302 or the second temperature-compensation resistance body 304 by trimming any of the adjustment portions 420, 422, 430, and 432 of the respective temperature-compensation resistance bodies 302 and 304 with a laser, etc. As a result, it is possible to adjust the resistance values of the first temperature-compensation resistance body 302 and the second temperature-compensation resistance body 304 so as to approach substantially the same value.

Therefore, compared with a case in which the resistance value of the first temperature-compensation resistance body 302 and the resistance value of the second temperature-compensation resistance body 304 are significantly different from each other, it is possible to easily perform the temperature compensation using the respective temperature-compensation resistance bodies 302 and 304.

In addition, in this embodiment, the thin-film resistance body 306, the first temperature-compensation resistance body 302, and the second temperature-compensation resistance body 304 are respectively provided with the adjustment portions 414, 416, 420, 422, 430, and 432.

Therefore, by trimming each of the adjustment portions 414, 416, 420, 422, 430, and 432, it is possible to bring the resistance value of each of the resistance bodies 306, 302, and 304 close to the target resistance value. Therefore, even if the resistance value of each of the resistance bodies 306, 302, and 304 formed on the substrate 12 deviates significantly from the target resistance value due to a state of the front surface 14 of the substrate 12 or other factors, it is possible to bring the resistance value of each of the resistance bodies 306, 302, and 304 closer to the target resistance value.

Although the present embodiment has been described in the above, the above-described embodiments merely illustrate a part of application examples of the present invention, and the technical scope of the present invention is not intended to be limited to the specific configurations of the above-described embodiments.

The present application claims priority to Japanese Patent Application No. 2022-050836, filed in the Japan Patent Office on Mar. 25, 2022. The contents of this application are incorporated herein by reference in their entirety.

EXPLANATION OF REFERENCE

10, 200, 300, 400 load sensor element
12 substrate
13 pressure receiving surface
14 front surface
16 inorganic layer
20, 306 thin-film resistance body
22, 204, 302 first temperature-compensation resistance body
24 back surface
26, 206, 304 second temperature-compensation resistance body
27 covered portion
28 exposed portion
30 pressure receiving region
32 main body portion
34 first end portion
36 second end portion
44 first direction side
70 first electrode
72 second electrode
96 third electrode
98 fourth electrode
100 thickness direction
120 fifth electrode
122 sixth electrode
202 hole
420) third adjustment portion
422 fourth adjustment portion
430 fifth adjustment portion
432 sixth adjustment portion

The invention claimed is:

1. A load sensor element for measuring a surface pressure load comprising:
 a substrate;
 an inorganic layer having a pressure receiving surface configured to receive a load, the inorganic layer being provided so as to cover a part of a first surface of the substrate;
 a thin-film resistance body formed of a resistance body whose resistance value is changed in response to the load received by the inorganic layer, the thin-film resistance body having: a main body portion sandwiched between the substrate and the inorganic layer; and both end portions arranged on an exposed portion of the substrate, the exposed portion being not covered by the inorganic layer;
 a first temperature-compensation resistance body independent from the thin-film resistance body, the first temperature-compensation resistance body being arranged on the exposed portion of the first surface of the substrate; and a second temperature-compensation resistance body arranged on a second surface of the substrate, the second temperature-compensation resistance body being configured to exhibit a same behavior as the first temperature-compensation resistance body.

2. The load sensor element according to claim 1, wherein
 a configuration configured to exhibit the same behavior includes at least one of: a first configuration in which a temperature coefficient of resistance of the first temperature-compensation resistance body and a temperature coefficient of resistance of the second temperature-compensation resistance body are set to be equivalent; and a second configuration in which, when a same deformation is applied, an absolute value of an amount of change in a resistance value of the first temperature-compensation resistance body and an absolute value of an amount of change in a resistance value of the second temperature-compensation resistance body are set to be equivalent.

3. The load sensor element according to claim 1, wherein
 the first temperature-compensation resistance body and the second temperature-compensation resistance body have a same shape and are arranged at positions overlapping with each other in a thickness direction of the substrate.

4. The load sensor element according to claim 1, wherein
 the substrate has a deformation suppressing portion in at least one of: between a pressure receiving region, with which the inorganic layer is overlapped in a thickness direction of the substrate, and the first temperature-compensation resistance body; or between the pressure receiving region and the second temperature-compensation resistance body.

5. The load sensor element according to claim 1, further comprising:
 a first electrode electrically connected to a first end portion of the thin-film resistance body, the first electrode being provided on the first side of the substrate;
 a second electrode electrically connected to a second end portion of the thin-film resistance body, the second electrode being provided on the first side of the substrate;
 a third electrode electrically connected to a first end portion of the first temperature-compensation resistance body, the third electrode being provided on the first side of the substrate;
 a fourth electrode electrically connected to a second end portion of the first temperature-compensation resistance body, the fourth electrode being provided on the first side of the substrate;
 a fifth electrode electrically connected to a first end portion of the second temperature-compensation resistance body, the fifth electrode being provided on the first side of the substrate; and
 a sixth electrode electrically connected to a second end portion of the second temperature-compensation resistance body, the sixth electrode being provided on the first side of the substrate, wherein
 a region of the first temperature-compensation resistance body from the first end portion in which the third electrode is provided to the second end portion in which the fourth electrode is provided is arranged at a location further away from the thin-film resistance body than the third electrode and the fourth electrode, and
 a region of the second temperature-compensation resistance body from the first end portion in which the fifth electrode is provided to the second end portion in which the sixth electrode is provided is arranged at a location further away from the thin-film resistance body than the fifth electrode and the sixth electrode.

6. The load sensor element according to claims 1, wherein at least one of the first temperature-compensation resistance body or the second temperature-compensation resistance body has an adjustment portion configured to adjust a resistance value.

* * * * *